United States Patent [19]
Van Maanen

[11] Patent Number: 5,385,221
[45] Date of Patent: Jan. 31, 1995

[54] CRANKING CLUTCH ASSEMBLY FOR USE IN CONJUNCTION WITH AN INPUT ISOLATOR FOR A VEHICULAR DRIVETRAIN

[75] Inventor: Keith D. Van Maanen, Bloomfield Hills, Mich.

[73] Assignee: General Motors Corporation, Detroit, Mich.

[21] Appl. No.: 162,505

[22] Filed: Dec. 3, 1993

[51] Int. Cl.$^6$ .................... F16H 45/00; F16D 3/66; F16D 13/44

[52] U.S. Cl. ..................... 192/3.21; 74/574; 192/87.11; 192/91 A; 192/106.2

[58] Field of Search ............... 192/3.25, 3.27, 3.32, 192/3.21, 3.29, 3.28, 87.11, 106.2, 89.22, 91 A; 74/574

[56] References Cited

U.S. PATENT DOCUMENTS

| | | | |
|---|---|---|---|
| 4,445,601 | 5/1984 | Hofbauer et al. | 192/91 A X |
| 4,966,261 | 10/1990 | Kohno et al. | 192/3.28 X |
| 5,121,821 | 6/1992 | Poorman et al. | 192/3.29 X |
| 5,156,249 | 10/1992 | Friedmann | 192/106.2 |
| 5,245,889 | 9/1993 | Kohno et al. | 192/106.2 X |

FOREIGN PATENT DOCUMENTS 3610127 12/1986 Germany .................. 192/3.28

Primary Examiner—Rodney H. Bonck
Attorney, Agent, or Firm—Donald F. Scherer

[57] ABSTRACT

The present invention relates to a vehicle drivetrain. The drivetrain includes an input shaft means and a fluid torque converter having a cover, an impeller and a turbine. A starter ring gear is secured to the torque converter cover to be engaged by a starter pinion. A coupling having first and second inertia masses operatively connects said input shaft means to the cover of the torque converter. An input isolator is disposed between the first and second inertia masses for permitting relative movement therebetween. A cranking clutch includes a driveplate and a Belleville spring, the Belleville spring biasing the driveplate against the torque converter cover and reducing the likelihood of the starter pinion disengaging prematurely from the starter ring gear during the engine start procedure.

9 Claims, 4 Drawing Sheets

CRANKING CLUTCH ASSEMBLY FOR USE IN CONJUNCTION WITH AN INPUT ISOLATOR FOR A VEHICULAR DRIVETRAIN

TECHNICAL FIELD

The present invention relates generally to vehicular drivetrains. More particularly, the present invention relates to vehicular drivetrains having a torque converter that incorporates an input isolator. Specifically, the present invention relates to a vehicular drivetrain which has a cranking clutch that effectively bypasses the input isolators, at least while the engine is being started.

BACKGROUND OF THE INVENTION

In drivetrain systems where the coupling between the engine and the torque converter is divided into two inertia masses, one connected with the engine and impeller and the other connected to the input shell or cover of a torque converter, an input isolator assembly is generally employed to transmit power between the inertia masses while damping torsional vibrations. The input isolators typically include a spring means.

Current automatic transmissions for vehicles typically employ not only a selectively engageable friction clutch but also an isolator assembly to connect the torque converter impeller and the torque converter turbine, thereby improving the efficiency of the drivetrain. One difficulty with such systems is that engaging the clutch at low engine speeds sometimes results in vibrations in the drivetrain which are perceptible by the driver. The engagement speed range for such arrangements is, therefore, limited.

Drivetrain designers have attempted to lower the engine speed at which the clutch can be engaged without generating the undesirable vibrational disturbances. Some designs have incorporated a viscous slipping clutch which is disposed in series with a friction clutch. This arrangement has the benefit of permitting lower engagement speeds, but it does increase the cost of the system.

Other designers have suggested dual mass flywheel systems to reduce drivetrain disturbances in countershaft type transmissions with synchronizer shifting controls. In such designs, the engine and transmission are completely disconnected during the ratio interchanges by a selectively engageable clutch member. These systems provide some improved drivetrain damping, but they increase the number of spring systems or friction interface connections, thus becoming relatively complex and concomitantly more costly.

One pertinent arrangement is disclosed in U.S. Pat. No. 5,121,821 to Poorman et al., which patent is owned by the assignee of the present invention. The Poorman disclosure is directed to a drivetrain coupling between the engine and the torque converter that permits the friction clutch to be fully engaged at lower engine speeds, while avoiding unpleasant disturbances in the drivetrain. To accomplish this goal, the inertia mass of the torque convertor, torque convertor cover and clutch is separated from the engine inertia mass and, along with a portion of the flywheel inertia, is added to the transmission inertia mass. By separating these inertias, the natural frequency of the system can be designed to a lower value, thereby permitting engagement of the clutch at lower engine speeds. Moreover, the isolator can be removed from the clutch for placement between the inertia masses. This design has been effective and generally accomplishes its intended goal.

The present invention contemplates a further improvement over the device as described in the aforesaid U.S. Pat. No. 5,121,821.

SUMMARY OF THE INVENTION

It is, therefore, a primary object of the present invention to provide a novel and improved drivetrain which includes a cranking clutch selectively to bypass the input isolator.

It is another object of the present invention to provide an improved drivetrain, as above, wherein a coupling assembly is divided into two inertia masses drivingly interconnected by a spring and friction isolator.

It is a further object of the present invention to provide an improved drivetrain, as above, wherein one inertia mass is rotationally coupled with the engine and impeller, and the other inertia mass is rotationally coupled with the cover of a torque convertor, the cranking clutch comprising a driveplate and biasing means to urge the driveplate against the torque convertor cover in order to maintain an operative connection between a starter pinion and the engine to connect the inertia masses during the engine start procedure.

It is still another object of the present invention to provide an improved drivetrain, as above, wherein a biasing means urges a driveplate against the torque convertor cover to bypass the isolator prior to initiation of the engine start procedure.

It is yet another object of the present invention to provide an improved drivetrain, as above, wherein a friction surface is biased by a Belleville spring to provide frictional contact between a driveplate and the torque convertor cover.

It is a still further object of the present invention to provide an improved drivetrain, as above, which incorporates means for disengaging the cranking clutch upon the starting of the engine.

These and other objects of the invention, as well as the advantages thereof over existing and prior art forms, which will be apparent in view of the following detailed specification, are accomplished by means hereinafter described and claimed.

In general, an improved drivetrain, embodying the concepts of the present invention, utilizes a cranking clutch in combination with a fluid torque convertor that incorporates an input isolator means. The fluid torque convertor has a cover, an impeller and a turbine. A coupling interconnects the crankshaft with the cover of the torque converter, and the coupling has first and second inertia masses. The first inertia mass is continuously rotatable with the engine, and the second inertia mass is continuously rotatable with the cover. The isolator means is disposed between the first and second inertia masses and permits relative movement therebetween.

A friction clutch is selectively engageable and connects the turbine and the second inertia mass for unitary rotation. The cranking clutch includes a driveplate and biasing means to bias the driveplate against the torque convertor cover. The biasing means is preferably a Belleville spring.

To acquaint persons skilled in the arts most closely related to the present invention, one preferred embodiment of a cranking clutch that illustrates a best mode now contemplated for putting the invention into practice is described herein by, and with reference to, the annexed drawings that form a part of the specification. The exemplary cranking clutch is described in detail without attempting to show all of the various forms and modification in which the invention might be embodied. As such, the embodiment shown and described herein is illustrative, and as will become apparent to those skilled in these arts, can be modified in numerous ways within the spirit and scope of the invention; the invention being measured by the appended claims and not by the details of the specification.

DESCRIPTION OF AN EXEMPLARY EMBODIMENT

Figure 1:
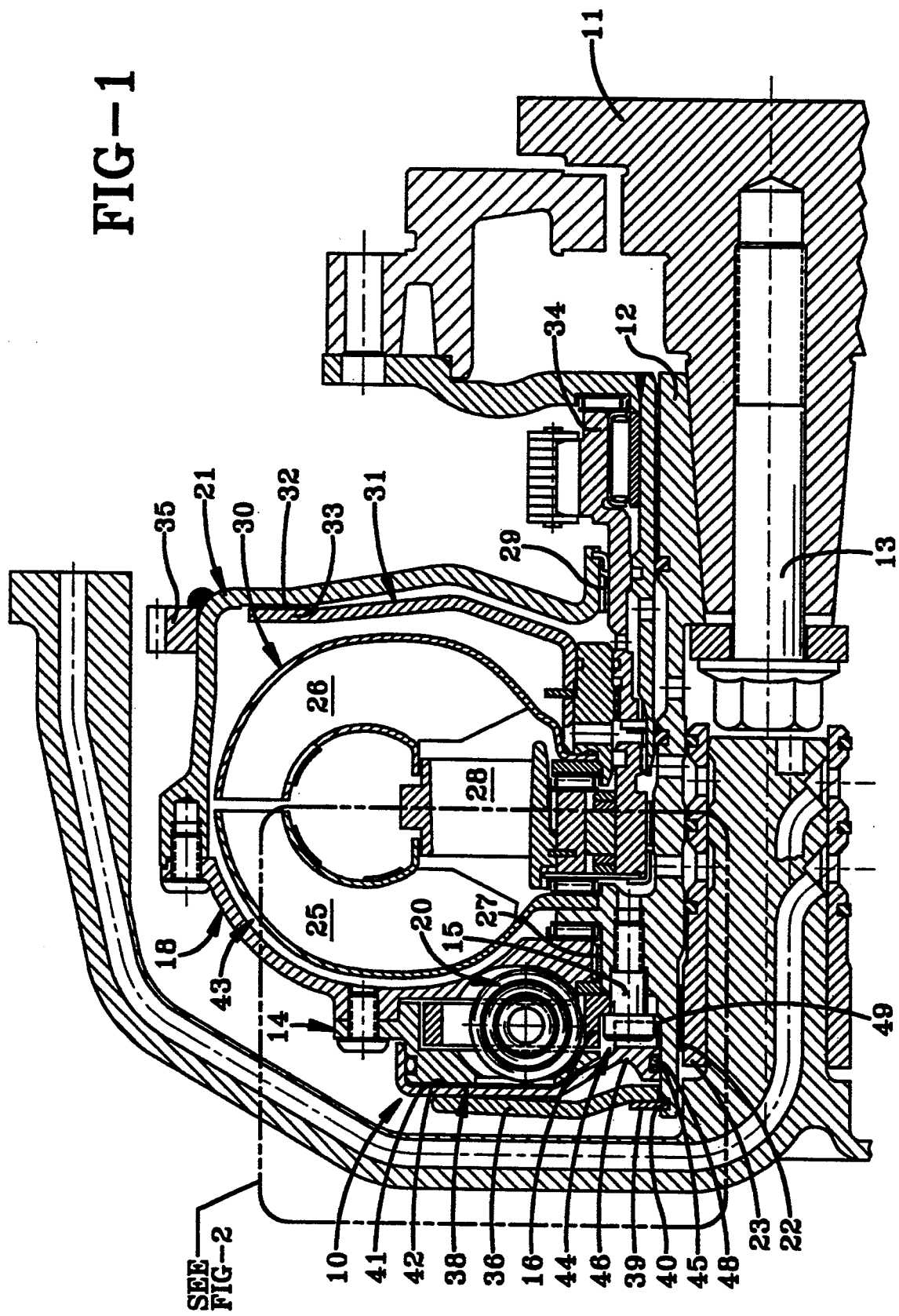
FIG. 1 is a cross-sectional elevation of a portion of a vehicle drivetrain showing an exemplary embodiment of a cranking clutch embodying the concepts of the present invention, the cranking clutch being engaged.
Figure 2:
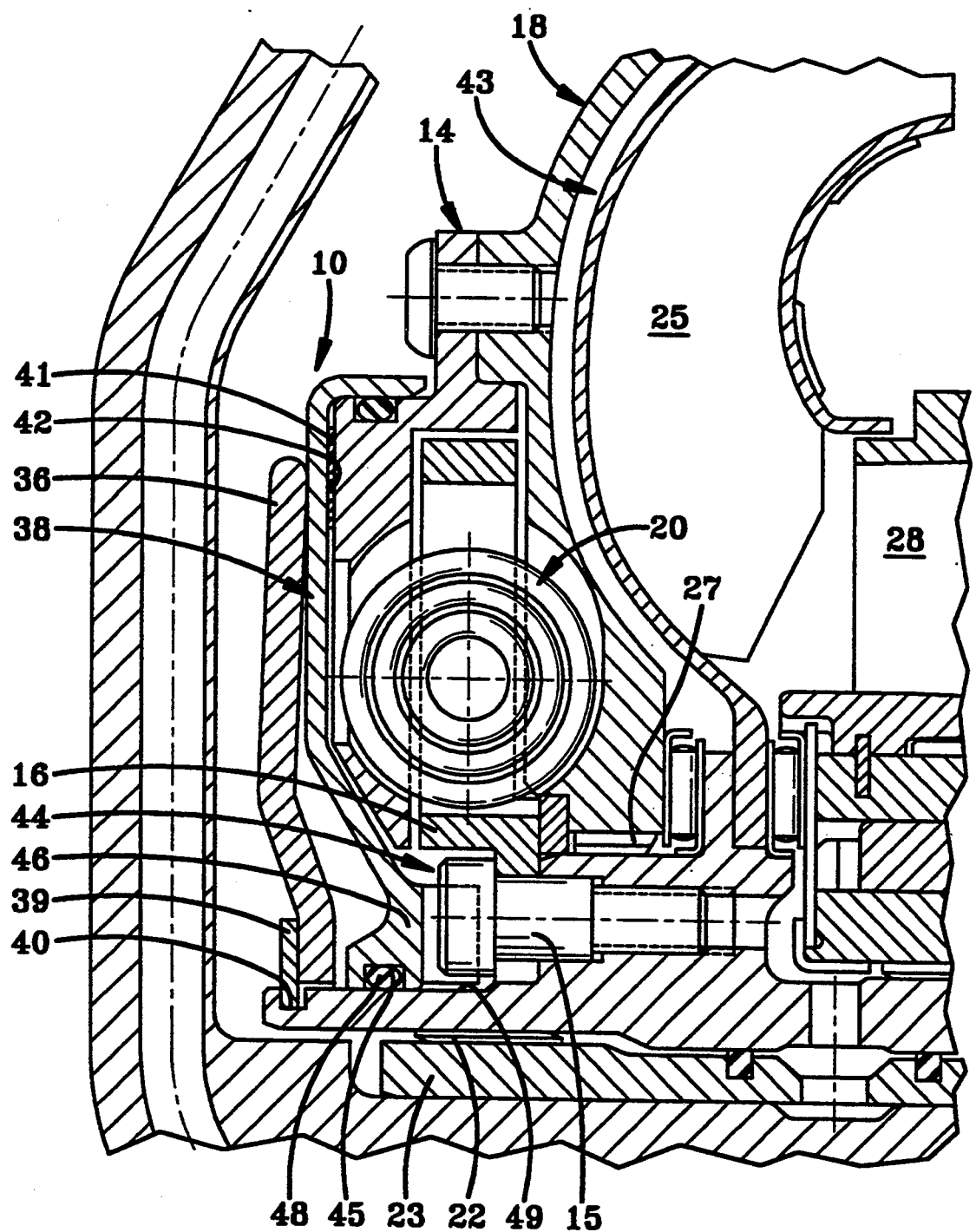
FIG. 2 is an enlarged view of that portion of FIG. 1 depicting not only the driveplate utilized by the cranking clutch assembly but also the associated components of a crankshaft extension and a torque converter.

One representative form of an improved cranking clutch assembly embodying the concepts of the present invention is designated generally by the numeral 10 on the accompanying drawings. With particular reference to FIGS. 1 and 2, an engine crankshaft 11 is secured to a crankshaft extension 12, as by a bolt 13. A coupling 14 is, in turn, secured to the crankshaft extension 12 by a second bolt 15. The coupling 14 includes an engine inertia mass 16, a two-piece housing or transmission inertia mass 18, and a plurality of isolator spring means 20.

The isolator spring means 20 are disposed between the transmission inertia mass 18 and the engine inertia mass 16 in a conventional manner. The isolator spring means 20 will permit limited relative annular excursion between the engine inertia mass 16 and the transmission inertia mass 18 in order to provide isolation between the torsional disturbances of the engine and the inertia masses 16 and 18.

The transmission inertia mass 18 is secured to a torque convertor cover 21 which is rotatably supported on bushings 27 and 29. The crankshaft extension 12 is supported through a bushing 22 on a sleeve 23 which is secured to a stationary housing.

The torque converter cover 21 is drivingly connected to a torque converter impeller 25 through spring means 20. The impeller 25 is disposed in toroidal flow relationship with a torque converter turbine 26 and a torque converter stator 28. The impeller, turbine and stator cooperate to form a conventional torque converter 30, the operation of which is sufficiently well known such that a further description of its structure and operation is not deemed to be necessary.

The torque converter 30 will permit slippage between the engine input and the turbine output which effectively dampens torsional vibrations and permits torque multiplication during the converter phase. As such, a torque converter will permit smooth vehicle acceleration and deceleration, while allowing the engine to operate at the most appropriate torque output level. These are the primary purposes for using a torque converter. The primary drawback of a torque converter is, of course, that during the coupling phase, slippage between the impeller and the turbine constitutes an efficiency loss and therefore adversely affects fuel economy.

In order to improve the fuel economy, a torque converter override clutch plate 31 is disposed between the turbine 26, and the torque converter cover 1. When the friction disk 32 on the radially outer portion 33 of the torque converter clutch plate 31 engages the converter cover 21, the torsional vibrations present at the engine crankshaft 11, such as those caused by the firing frequency of the engine cylinders, can be transmitted to the torque converter output 34. The isolator spring means 20 are operable to effect a significant reduction or elimination of the transmission of transient torque spikes that might otherwise be imposed on the torque converter output 34.

As depicted, the isolator spring means 20 separate the engine inertia mass 16 from the transmission inertia mass 18. By astute separation of these inertia masses, the natural frequency of the system can be reduced to a lower value, thereby permitting engagement of the override clutch plate 31 at lower engine speeds.

The interstices between the components of that portion of the drivetrain depicted result in the free flow of hydraulic fluid therethrough, such that the fluid can accomplish cooling and lubrication of the various coupling components. As will be hereinafter more fully explained, the flow of hydraulic fluid through the interstices will assist in the operation of the cranking clutch 10. In order to prevent the fluid from leaking to atmosphere, some applications employ a bladder (not shown) that encapsulates the interior of the torque converter 30.

It has been determined that the addition of a cranking clutch assembly 10 can improve performance when starting the engine.

With reference to FIGS. 1-4, when a torque converter 30 is coupled to an engine crankshaft through an input isolator 20, it is often desirable to attach a starter ring gear 35 to the torque converter cover 21. However, this location of the starter ring gear 35 can be inconvenient when cranking the engine during the starting procedure. Because the cranking torque must be transmitted through the isolator spring means 20, the relatively low torsional rate of the input isolator spring means can allow the system to oscillate with a high amplitude and prematurely disengage the starter pinion (not shown) from the starter ring gear 35. This potential problem can be reduced or eliminated by using a cranking clutch 10 such as shown in FIGS. 1-4.

The cranking clutch 10 comprises a biasing means 36 and a driveplate 38. In a preferred embodiment, the biasing means 36 may be a Belleville spring that is mounted on the shaft extension 12 by a retaining ring 39 received within an annular recess 40 provided in the radially outer surface of the shaft extension 12. The driveplate 38 is tanged or splined to the crankshaft extension 12 and includes friction material 41 on the radially outwardly disposed portion of that surface 42 of the drive plate 38 which faces the torque converter cover 21. The biasing force applied by the Belleville spring 36 as it engages the driveplate 38 urges the friction material 41 on the driveplate 38 into engagement with the torque converter cover 21 so that cranking torque can be transmitted from the starter ring gear 35 to the crankshaft extension 12 while bypassing the isolator spring means 20.

Once the engine has started, however, the pressure of the hydraulic fluid which charges the torque converter forces the hydraulic fluid through the interstices and against the driveplate 38 to disengage the cranking clutch 10. This enables the input isolator spring means 20 to function as intended.

Figure 4:
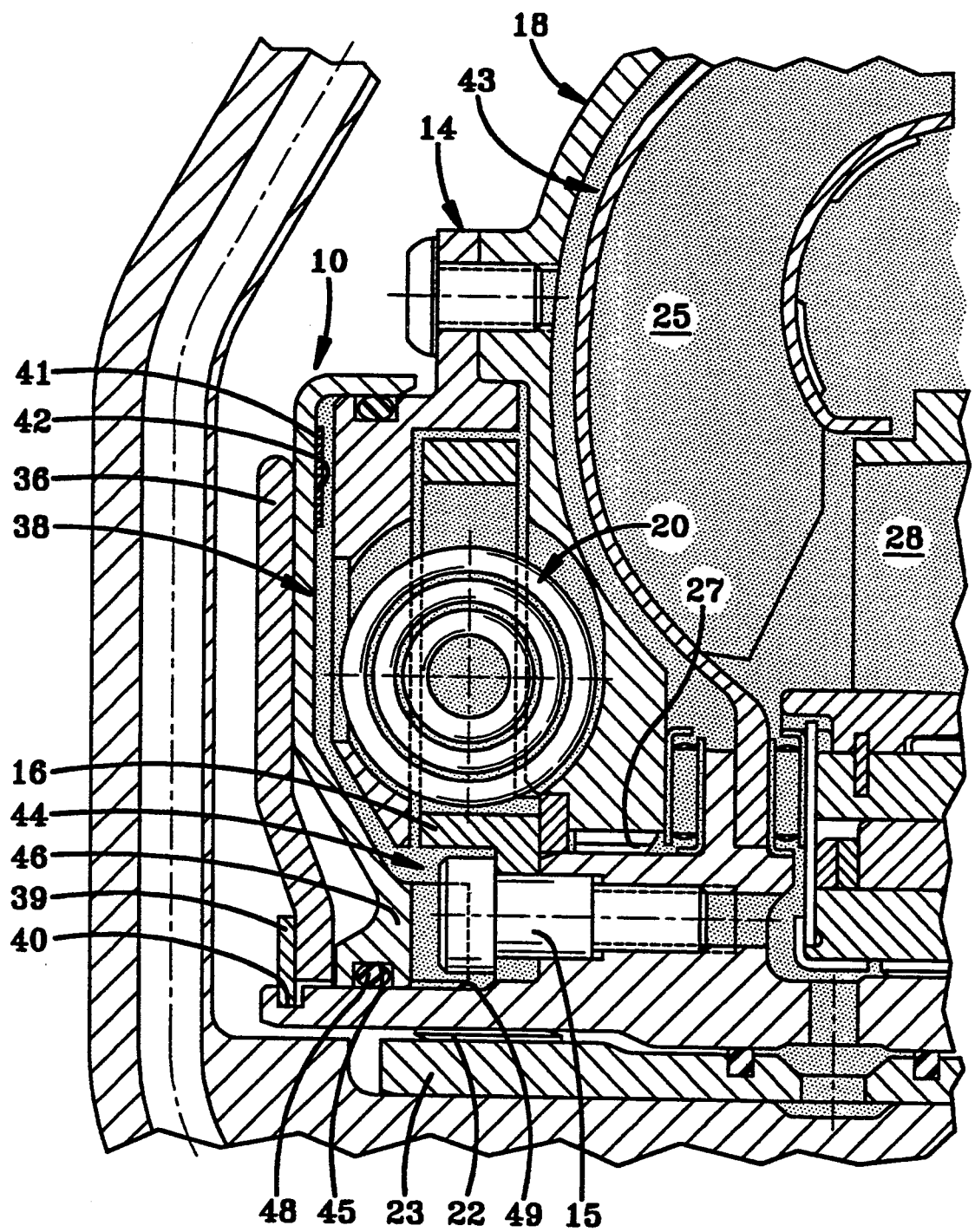

Typically, the interstices between the various components of the torque converter 30 and the associated assembly—as indicated by the shade lines in FIG. 4—are sufficient to effect the desired timing to the actuation of the cranking clutch 10, but if desired, a passageway (not shown) may be provided between the main torque converter cavity 43 and a cranking clutch deactivating cavity 44—that is bounded on one side by surface 42 on the driveplate 38 —can be provided to effect a desired timing for the disengagement of the cranking clutch 10.

In order to assure the integrity of the cranking clutch deactivating cavity 44, an annular recess 45 may be recessed within the hub portion 46 of the driveplate to receive a sealing means 48, such as the O-ring depicted, that will sealingly engage the cylindrical outer surface 49 of the shaft extension 12. It should be appreciated that a plurality of such passageways may be provided in the structure depicted in order to facilitate access of the fluid serving to cool and to lubricate the structure.

The cranking clutch 10 provides a positive drive to rotate the engine crankshaft 10 when the starter motor is rotated, while bypassing the isolator spring means 20.

Figure 3:
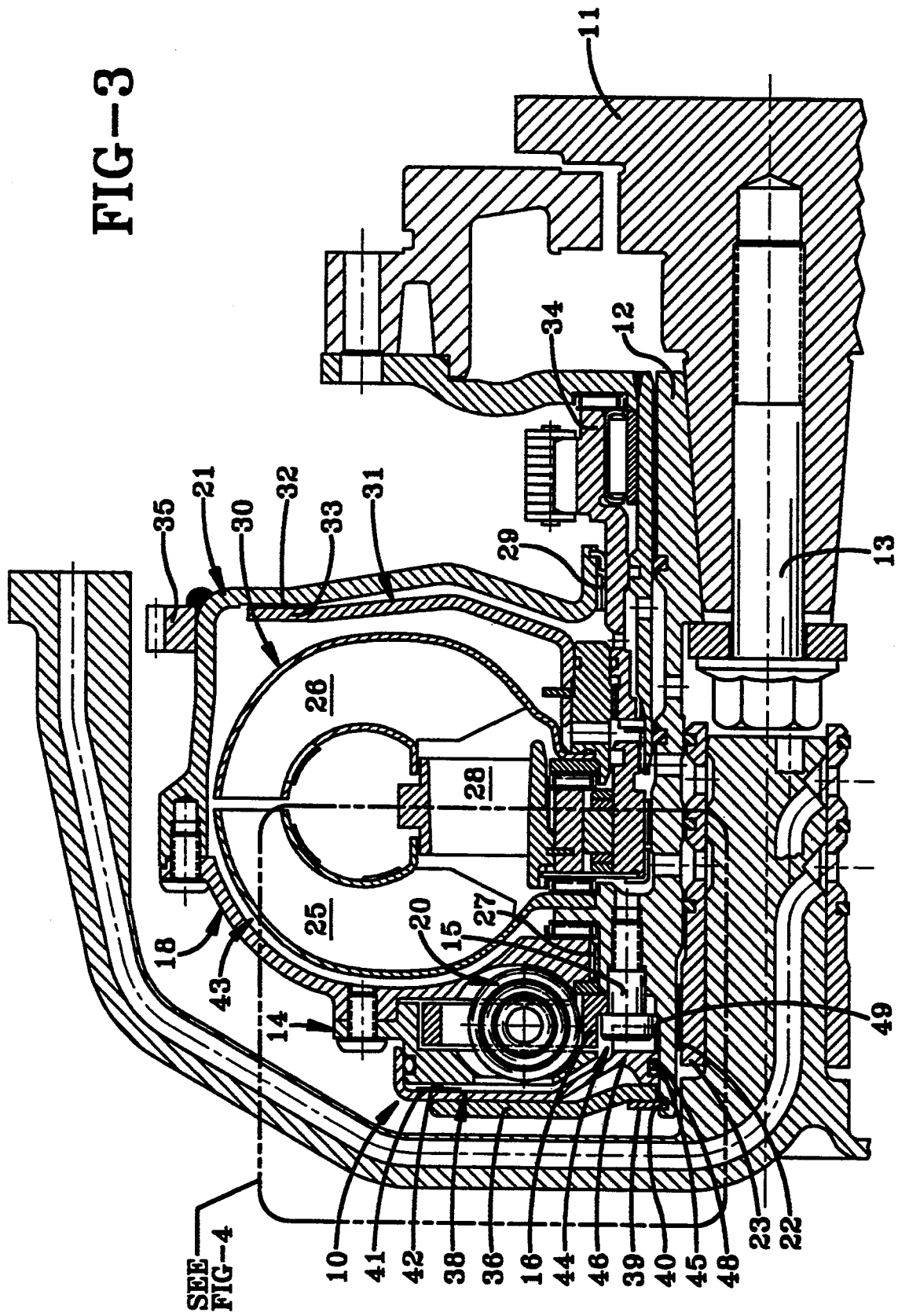
FIG. 3 is a cross-sectional elevational view similar to FIG. 1 but depicting the cranking clutch disengaged; and, FIG. 4 is an enlarged area similar to FIG. 2, but depicting the cranking clutch disengaged, as represented in FIG. 3.

With reference to FIGS. 1 and 2, the cranking clutch 10 is represented in an engaged position, with the driveplate 38 contacting the torque converter cover 21. In FIGS. 3 and 4 the cranking clutch 10 is represented in a disengaged position.

While only a preferred embodiment of my present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention teaches that a cranking clutch embodying the concepts of the present invention and employed in a torque converter incorporating an input isolator is not only capable of maintaining a driving connection between the input shaft means and said conjoined cover and impeller during the engine starting procedure, but also that the other objects of the invention can be likewise accomplished by use of the improved cranking clutch.

The embodiments of the invention in which an exclusive property or privilege is claimed are defined as follows:

1. A vehicular drivetrain comprising:
   an input shaft means;
   a fluid torque converter having a cover, an impeller and a turbine;
   a coupling;
   said coupling interconnecting said input shaft means and impeller with said torque converter cover;
   said coupling having first and second inertia masses;
   said first inertia mass continuously rotatable with said input shaft means;
   said second inertia mass continuously rotatable with said cover;
   isolator means disposed between said first and second inertia masses for permitting relative movement therebetween; and,
   a cranking clutch assembly having a driveplate carried on said input shaft means and biasing means to bias said driveplate into driving engagement with said torque converter cover during selected phases in the operation of said input shaft means.

2. A vehicular drivetrain, as set forth in claim 1, wherein:
   said biasing means is a spring.

3. A vehicular drivetrain, as set forth in claim 2, wherein:
   said spring is a Belleville spring.

4. A vehicular drivetrain, as set forth on claim 1, wherein said driveplate further comprises:
   a surface facing said converter cover;
   a friction means secured to said driveplate surface for providing driving contact between said driveplate and said torque converter cover.

5. A vehicular drivetrain, as set forth in claim 4, wherein:
   said driveplate has a radially outer portion; and,
   said friction means is affixed to said radially outer portion.

6. A vehicular drivetrain, as set forth in claim 1, further comprising:
   means for disengaging said cranking clutch upon starting of said engine.

7. A vehicular drivetrain, as set forth in claim 6, wherein said disengaging means comprises:
   pressurized fluid from said torque converter.

8. A vehicular drivetrain, as set forth in claim 7, wherein:
   a pressure chamber is provided in said torque converter;
   passage means are provided between said pressure chamber in said torque converter and said driveplate;
   said pressurized fluid flows through said passage means.

9. A vehicular drivetrain, as set forth in claim 8, wherein:
   the size of said passage means is selected to adjust the timing of said disengagement of said cranking clutch.

* * * * *